(12) United States Patent
Fu et al.

(10) Patent No.: US 6,235,249 B1
(45) Date of Patent: *May 22, 2001

(54) ROTARY OXIDIZER SYSTEMS FOR CONTROL OF RESTAURANT EMISSIONS

(75) Inventors: James Chen-chen Fu, Plainsboro; James Mon-her Chen, Edison, both of NJ (US)

(73) Assignee: Engelhard Corporation, Iselin, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 08/964,736

(22) Filed: Nov. 5, 1997

Related U.S. Application Data

(63) Continuation-in-part of application No. 08/831,108, filed on Apr. 1, 1997, now Pat. No. 5,871,347.

(51) Int. Cl.[7] .......................... B01D 53/34; B01D 53/86; F01N 3/10; F24C 15/20
(52) U.S. Cl. .......................... 422/173; 422/175; 422/177; 422/178; 422/180
(58) Field of Search .................................... 422/173, 175, 422/177, 178, 180; 432/72; 110/210–212; 165/7, 8–10

(56) References Cited

U.S. PATENT DOCUMENTS

| | | |
|---|---|---|
| 4,138,220 | 2/1979 | Davies et al. ......................... 422/173 |
| 4,350,504 | 9/1982 | Diachuk ................................. 55/217 |
| 4,678,643 | 7/1987 | Fetzer .................................... 422/175 |

(List continued on next page.)

FOREIGN PATENT DOCUMENTS

| | | | |
|---|---|---|---|
| 30 12 518 | 10/1980 | (DE) | ................................ B01J/8/02 |
| 0 193 511 A2 | 9/1986 | (EP) | ............................... B01J/19/28 |
| 0 254 197 A2 | 2/1990 | (EP) | ................................. F23G/7/06 |
| 0 571 161 A2 | 11/1993 | (EP) | ............................... F24C/15/20 |
| 0 684 427 A1 | 11/1995 | (EP) . | |
| 61-157332 | 7/1986 | (JP) | ............................... B01D/53/36 |
| WO 94/23246 | 10/1994 | (WO) . | |
| WO 96/20039 | 7/1996 | (WO) . | |

OTHER PUBLICATIONS

Girocat Sales Brochure, G E C Alsthom, Air Industrie Systemes, No Date.
rotosolv, rotocat Sales Brochure, No Date.
Synopsis on Set Public Hearing Nov. 14, 1997 to Adopt Proposed Rule 1138—"Control of Emissions from Restaurant Operations", South Coast Air Quality Management District, Agenda No. 5.

*Primary Examiner*—Hien Tran
(74) *Attorney, Agent, or Firm*—Stephen I. Miller

(57) ABSTRACT

A restaurant emissions abatement system is disclosed which employs a rotary heat regenerative thermal or catalytic oxidizer. Thus, heat which normally would be exhausted into the atmosphere, is recovered by being transferred to incoming unoxidized restaurant emissions. The rotary oxidizers may be of a variety of designs including orientations which allow for perpendicular or axial flow of the emissions stream through the rotary oxidizer relative to the axis of rotation. The rotary design of the oxidizers also provides an advantage of permitting in-situ cleaning of the oxidizer (i.e., not having to remove oxidizer from abatement system) by simply lowering the speed of the oxidizer's rotation or stopping rotation altogether to permit hot gases to thoroughly oxidize accumulations of such contaminants as greases and fats.

9 Claims, 5 Drawing Sheets

U.S. PATENT DOCUMENTS

| | | | |
|---|---|---|---|
| 4,834,962 | 5/1989 | Ludwig | 423/351 |
| 4,900,712 | 2/1990 | Bar-Ilan et al. | 502/304 |
| 5,016,547 | 5/1991 | Thomason | 110/211 |
| 5,169,414 | 12/1992 | Panzica et al. | 55/60 |
| 5,362,449 | 11/1994 | Hedenhag | 422/175 |
| 5,431,887 | 7/1995 | Bar-Ilan | 422/177 |
| 5,460,789 | 10/1995 | Wilhelm | 422/173 |
| 5,547,640 | 8/1996 | Kim | 422/177 |
| 5,562,442 | 10/1996 | Wilhelm | 422/72 |
| 5,580,535 | 12/1996 | Hoke et al. | 423/245.3 |
| 5,584,916 | 12/1996 | Yamashita et al. | 96/123 |
| 5,589,142 | 12/1996 | Gribbon | 422/171 |
| 5,622,100 | 4/1997 | King et al. | 99/386 |
| 5,628,968 | 5/1997 | Hug et al. | 422/173 |
| 5,643,538 | 7/1997 | Morlec et al. | 422/173 |
| 5,871,347 * | 2/1999 | Chen et al. | 422/173 |

* cited by examiner

ROTARY OXIDIZER SYSTEMS FOR CONTROL OF RESTAURANT EMISSIONS

RELATED APPLICATION

This is a continuation-in-part application of U.S. Ser. No. 08/831,108 filed Apr. 1, 1997, now U.S. Pat. No. 5,871,347 and which is herein incorporated by reference.

BACKGROUND OF THE INVENTION

1. Field of the Invention

This invention relates to a system for abating the smoke containing particulate matter (PM) (i.e., liquid droplets of grease or fat) and volatile organic compounds (VOCs) generated from the burning of fats, greases, proteins, and/or carbohydrates, during food preparation. More particularly, this invention is concerned with restaurant emissions smoke abatement using a rotary regenerative thermal or catalytic oxidizer.

2. Related Art

In the treatment of restaurant emissions except for chain-driven charbroilers, restaurant catalysts are normally installed inside the exhaust duct of a cooking ventilation system at a position close to the exhaust hood outlet. Due to the mixing with cool room air, the hot exhaust generated from the cooking process is significantly cooled before it reaches the exhaust hood. To initiate thermal or catalytic oxidation, the exhaust gas stream is needed to be reheated back to higher temperatures more conducive to either thermal or catalytic oxidation of the cooking exhaust contaminants. The additional heat is applied either directly on the catalyst support or to the exhaust gas stream. In addition to the preheating, the exotherm generated by the catalytic oxidation reaction also elevates the temperature of the exhaust gas. This often makes the temperature of the gas coming out of the catalytic reactor exceed the temperature operation limitation of the exhaust fan located at the end of the ductwork. To resolve this problem, outside makeup air is typically introduced into the duct before the fan to lower the exhaust temperature. Therefore, the capacity of the exhaust fan is undesirably increased to handle the extra load of air flow. The high costs of additional heating and oversized exhaust fans often hinder the use of catalytic systems for restaurant emission control.

U.S. Pat. No. 4,138,220 describes an apparatus for catalytic oxidation of grease and fats in low temperature fumes. The apparatus recovers at least some of the heat energy of the treated, exiting stream as heat from this stream is transferred to the entering stream prior to passage over the catalyst. The heat exchange device describes is a counter-current heat exchanger, separate and apart from the catalyst. However, this patent is silent with regard to a heat exchange device for recovering heat exiting the apparatus which rotates and is an integral part of the catalyst system, i.e., the catalyst in the '220 patent is not deposited in or on the heat exchange device.

Applicants provide an advance over the prior art in the treatment of restaurant emissions by providing a rotary heat exchange device for thermally or catalytically destroying restaurant emissions. The advantages of which are herein below described.

SUMMARY OF THE INVENTION

The present invention provides a smoke abatement system for removal of particulate matter (PM) and volatile organic compounds (VOCs) from a cooking emissions stream comprising:

an inlet duct for receiving the cooking emissions stream and directing the stream to a rotary, heat regenerative device;

the rotary device comprising means to recover heat from the emissions stream after thermal or catalytic oxidation and before the oxidized emission stream is returned to the atmosphere; and an outlet duct for directing the oxidized emission stream from the rotary device to the atmosphere.

As used herein, the term atmosphere is intended to include both the ambient "outside" atmosphere and the ambient "inside" atmosphere of enclosed structures such as buildings. Therefore, the present invention contemplates treating emissions from an indoor kiosk-type cooking device, wherein the treated cooking emissions exiting from the rotary device of the present invention is exhausted or vented to the atmosphere ("indoor") of the building.

The method of the present invention provides directing the cooking emissions stream from an inlet duct to the rotary regenerative oxidizer, for heating and oxidation therein. The emissions stream then flows through a transfer chamber, which, if desired, thermally oxidizes any remaining particulates or VOCs, in the stream, and thereafter flows through an output portion of the rotary oxidizer for venting to the atmosphere or other use.

A second embodiment also operates in steady state and comprises a stationary catalyzed or uncatalyzed heat regenerative bed, and, a one-piece rotary element that continuously rotates the air flow entering and exiting the bed, thereby alternating the various gas flows through the system.

If desired, the present invention may accommodate a purge stream which redirects cleansed exhaust air or other air back through the regenerative bed, thereby removing trapped contaminants. Furthermore, the aspects of the present invention also correspond to embodiments containing an uncatalyzed thermal oxidizer of the same rotary heat regenerative design.

A further advantage of the invention provides simplified, in-situ cleaning of the rotary oxidizer as the speed of rotation of the oxidizer may be conveniently lowered or stopped to allow for flow of a hot, cleaning stream to oxidize any greases or fats that may accumulate on the "cold" spots of the rotary oxidizer. This advantage circumscribes the inconvenience associated with current restaurant catalysts which typically have to be removed from the apparatus to be cleaned.

Yet another advantage of the present invention, as would be understood by one skilled in the art, is the inherent removal of odors while oxidizing with the smoke generated by cooking emissions. That is to say, oxidation of cooking emission contaminants will desirably destroy the organic compounds responsible for the odors emitted during cooking. Thus, an added benefit of this invention is removal of undesirable odors emanating from cooking emissions.

Figure 1:
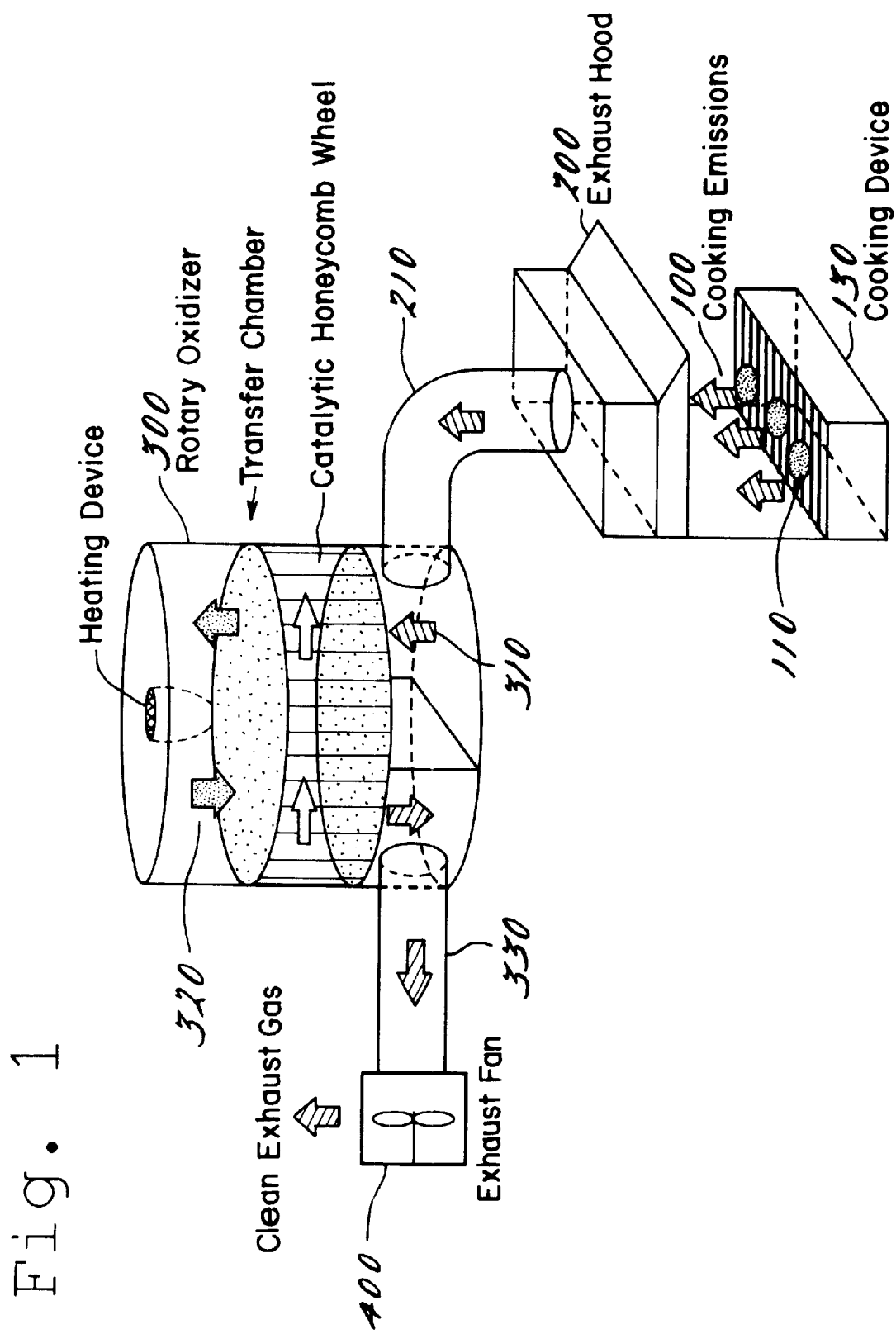
FIG. 1 schematically illustrates the smoke abatement system of the present invention.

Although the embodiments may be illustrated in certain spatial orientations, one skilled in the art will readily appreciate that the rotary oxidizers of the present invention may be horizontally, vertically, or otherwise orientated and that the cooking emissions can pass through the rotary oxidizer perpendicularly or axially relative to the axis of rotation of the rotary oxidizer.

DETAILED DESCRIPTION OF THE PREFERRED EMBODIMENT(S)

This invention applies the concept of a rotary regenerative thermal or catalytic oxidizer for control of restaurant emissions. This new design uses a round metal or ceramic honeycomb wheel and optionally is at least partially coated with a catalyst capable of oxidizing restaurant emissions. In a preferred embodiment, more fully described herein, the wheel is equally divided into two sections at an inlet face. The cooking exhaust from the hood passes through one side of the honeycomb wheel, and then flows into a transfer chamber at the opposite end, in which a gas-fired burner or an electrical heater may be installed. The heater may be used to raise the gas temperature to a level at which catalytic oxidation is initiated. After the transfer chamber, the gas exits to the exhaust duct through the other side of the wheel. The gas phase VOC and particulate matter are oxidized to $CO_2$ and water by thermal or catalytic reaction as the gas stream flows through the wheel.

The wheel is designed to rotate at speeds of about 5 to 10 rpm between the inlet (cold) and outlet (hot) gas streams working as a heat exchanger, transferring heat from the hot gas at outlet side to the cold gas at inlet side. This assures that gas leaving the unit is cooled and prevents the downstream exhaust fan from being exposed to the higher temperatures of thermal or catalytic oxidation. Also, due to its high thermal efficiency (capable of recovery of upwards of 90–95% of the heat extracted from the outlet stream to the inlet stream), the unit needs little or no energy to keep the cooking exhaust at temperatures for efficient catalytic reaction after it reaches steady state. This provides great savings in operating cost for the restaurant owners.

The present invention also provides a simplified method in which to clean the rotary thermal or catalytic oxidizer. To prevent fires, restaurant catalysts have to be cleaned periodically to remove the grease and other volatile organic compound build-up which will accumulate on the cold spots of the oxidizer. The normal cleaning routine, which is labor intensive and time consuming, involves removing the catalyst module from the duct, rinsing it with water and light detergent, drying it, and putting it back. This invention offers a simple and fast in-situ self-cleaning method. By lowering the rotation speed (<1 rpm) or stopping rotation completely, heat transfer efficiency of the wheel can be reduced significantly. Therefore, the whole outlet section of the wheel can be heated up close to combustion chamber temperature which is normally hot enough to burn out all the residue grease with the help of catalyst if present.

Referring to FIG. 1, one see a schematic of the restaurant cooking ventilation system of the present invention. Cooking emissions 100 are generated from cooking food 110 on a cooking device 130. The cooking emissions 100 are drawn into exhaust hood 200 and further drawn through inlet duct 210 leading to the rotary oxidizer 300. The rotary oxidizer 300, while depicted in a preferred embodiment further described herein below, transfers heat from the exiting oxidized cooking emissions stream 320 to the incoming unoxidized cooking emissions stream 310. Thus, the oxidized stream exits the rotary oxidizer 300 through outlet duct 330 at a temperature that is lower than the oxidation temperature and which is more favorable to the operation of exhaust fan 400 located in or at the end of outlet duct 330.

Figure 2:
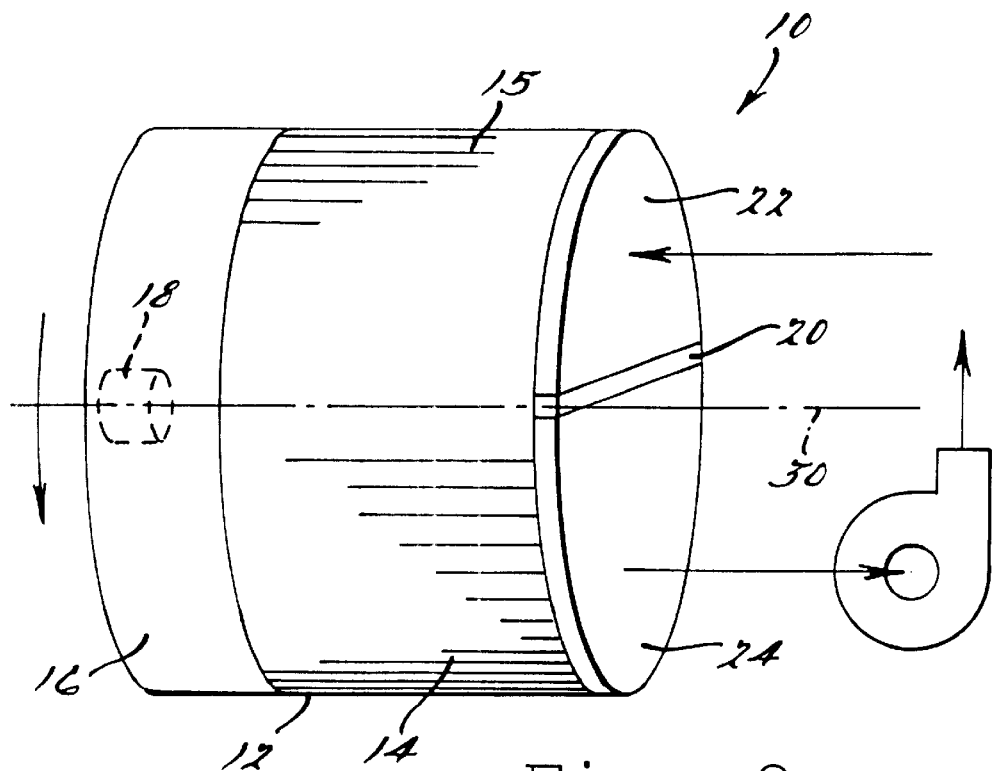
FIG. 2 schematically illustrates a first embodiment of the rotary regenerative catalytic oxidizer, having a rotatable heat regenerative bed.
Figure 3:
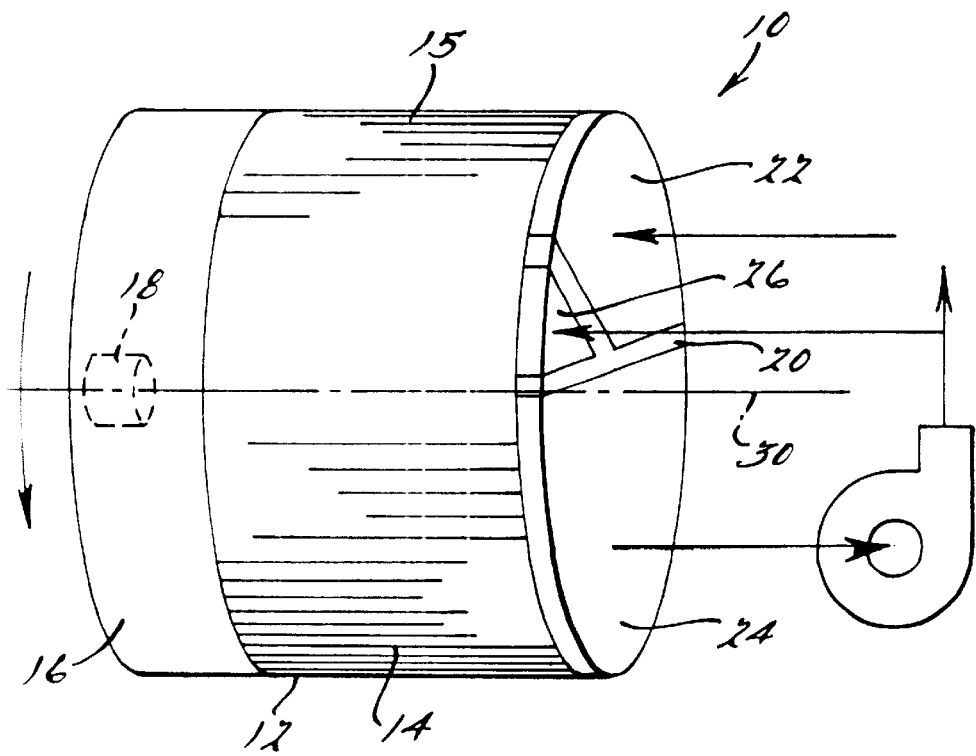
FIG. 3 schematically illustrates a first embodiment of the rotary regenerative catalytic oxidizer having a purge stream.

In accordance with a preferred embodiment of the present invention the smoke abatement system uses a rotary regenerative catalytic oxidizer 10 (hereinafter "RCO"), as shown in FIG. 2 and contains a cylindrical housing 12. A cylindrical catalytic regenerator rotor 14 is disposed within housing 12. A transfer chamber 16 is sealed and connected to housing 12 at a second end of rotor 14. A heater device 18 is disposed within chamber 16. The heater device 18 may comprise a burner, an electric heater, or other heat generating means and may be utilized either externally or internally of chamber 16. A first sealing endplate 20 is stationary and adjoins a first end of the rotor 14, thereby dividing the rotor 14 into an inlet compartment 22 and an outlet compartment 24. As seen in FIG. 3, endplate 20 may be modified in accordance with a second embodiment of the present invention to further include a purge compartment 26 within the rotor 14. Endplate 20 may be sealed to the rotor 14 either physically, pneumatically, hydraulically, or by any other method known in the art. A longitudinal axis 30 is centrally disposed within RCO 10, about which the rotor 14 rotates.

Rotor 14 is preferably constructed from a plurality of discrete and axially parallel, longitudinally disposed surfaces forming channels 15, each having a first and a second end. Each channel is constructed from heat exchange media such as ceramic, cordierite for example, or metal, stainless steel for example. Other metals that may be used include aluminum, carbon steel, and stainless steel. The preferred design is not limited to any geometric shape, and round, square, hexagonal, or other cross-sectional configurations may be utilized. More importantly, the heat exchange channels 15 form a monolith that is free from independent internal partitions that divide the heat exchange area into different flow regimes.

Depending on design criteria, the axially parallel heat exchange surfaces may be either completely or partially washcoated with a catalyst such as $Pt/TiO_2$, manganese, chromium oxide, or combinations thereof. Suitable catalysts for use in this invention are those adapted for use in treatment of restaurant emissions such as disclosed in U.S. Pat. Nos. 5,580,535; 4,900,712; and 4,138,220 the disclosures of which are incorporated by reference. In accordance with the present invention, longitudinally disposed channels reduce pressure fluctuations, and, due to impermeable walls, prevent the exchange of gases in the adjacent channels and eliminate the need for a separate sealing means between the ingoing and outgoing process gases. The heat exchange media should have a cell density ranging from at least 25 CPSI (cells per square inch), but more preferably 64 CPSI, to 1000 CPSI or higher, to have sufficient area to enhance both heat and mass transfer and reduce the size of the rotor 14. However, one of ordinary skill in the art will readily appreciate that such a design factor should not be construed as limiting the scope of the present invention.

In operation and during rotation of the RCO, process gases enter through inlet 22 and pass through the rotor 14 and channels 15 for catalytic oxidation of the contaminants therein. The process gases then pass through transfer chamber 16, and may be thermally oxidized therein, if desired. The heater device 18 may be simply used to control the fuel and supply the heat necessary for startup of the catalytic process, or it may be used on a continuous basis, thereby facilitating thermal oxidation within chamber 16. Fuel, for example natural gas, is supplied to the transfer chamber 16, through the heater device 18. The purified gases are then directed back through channels within outlet compartment 24 and exhausted. As seen in FIG. 3, a fraction of the purified outlet stream or other clean air may be diverted back into the RCO through an optional purge compartment 26. Other purge methods, by vacuum for example, may also be incorporated.

As rotor 14 rotates, each of the channels 15 periodically passes through inlet compartment 22 through which process gases enter the RCO 10. If the purge option is desired, as the same channels continue to revolve, they next pass through purge compartment 26, wherein purified air forces any unreacted process gases into chamber 16. As shown in FIG. 3, purge compartment 26 is located between inlet and outlet compartments 22 and 24, respectively. When the channels 15 function as inlet channels, a spike of contaminated air may become trapped therein. The purge feature prevents the contaminated air from being released as the channels subsequently rotate into the output compartment and function as exhaust channels.

Upon further rotation, the channels 15 then pass through outlet compartment 24 from which purified air from transfer chamber 16 is exhausted. At the same time, the regenerative channels retain the heat of combustion thereby maximizing fuel efficiency and providing the catalytic heat necessary during the input function. At any given moment, rotor 14 comprises a plurality of grouped channels that are segregated into either an inlet, purge, or outlet function. As shown in FIGS. 2 and 3, the function of a given channel will vary as it revolves through the different flow regimes defined by endplate 20.

It may also be desirable to utilize a flame arrestor in conjunction with the present invention. A flame arrestor functions to prevent cooking flames from reaching the rotary oxidizer as well as to aid in more uniform distribution of the cooking emissions. Suitable flame arrestors and benefits associated with positioning of the flame arrestor within a smoke abatement system are described for example in U.S. Pat. Nos. 5,431,887 and 5,622,100 the disclosures of which are incorporated by reference.

Figure 4:
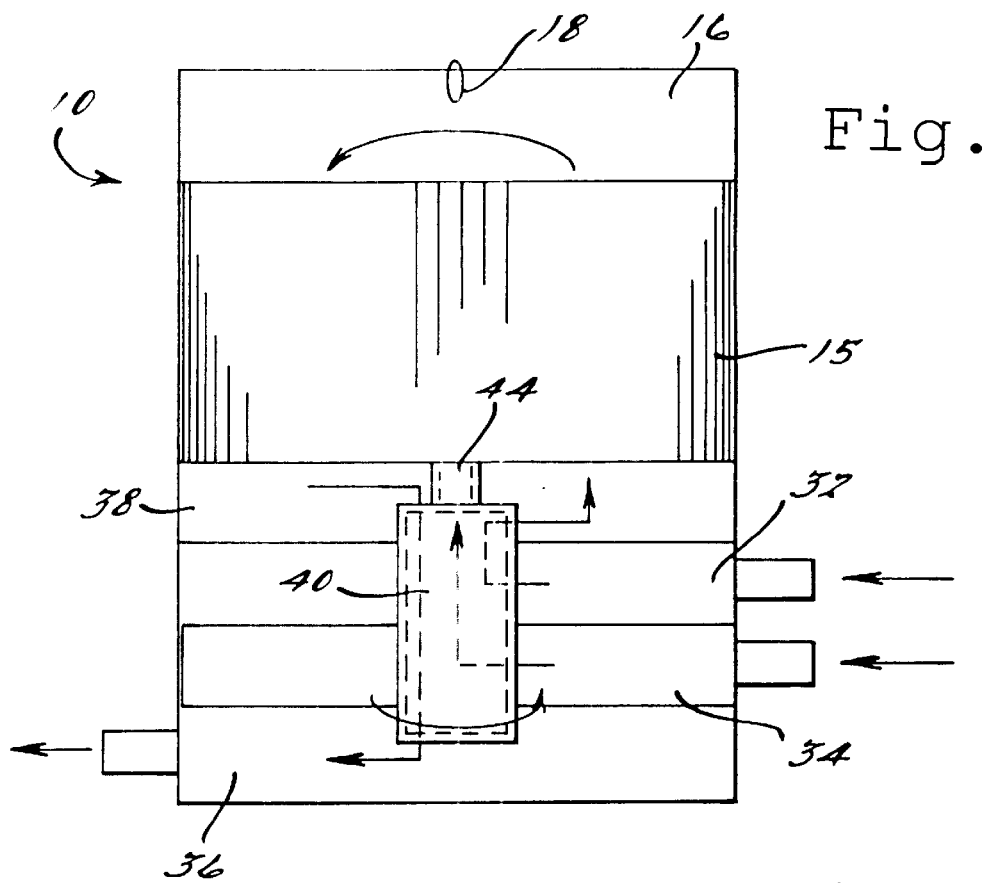
FIG. 4 schematically illustrates a second embodiment of the rotary regenerative catalytic oxidizer, having a rotary element and a stationary heat regenerative bed.
Figure 5:
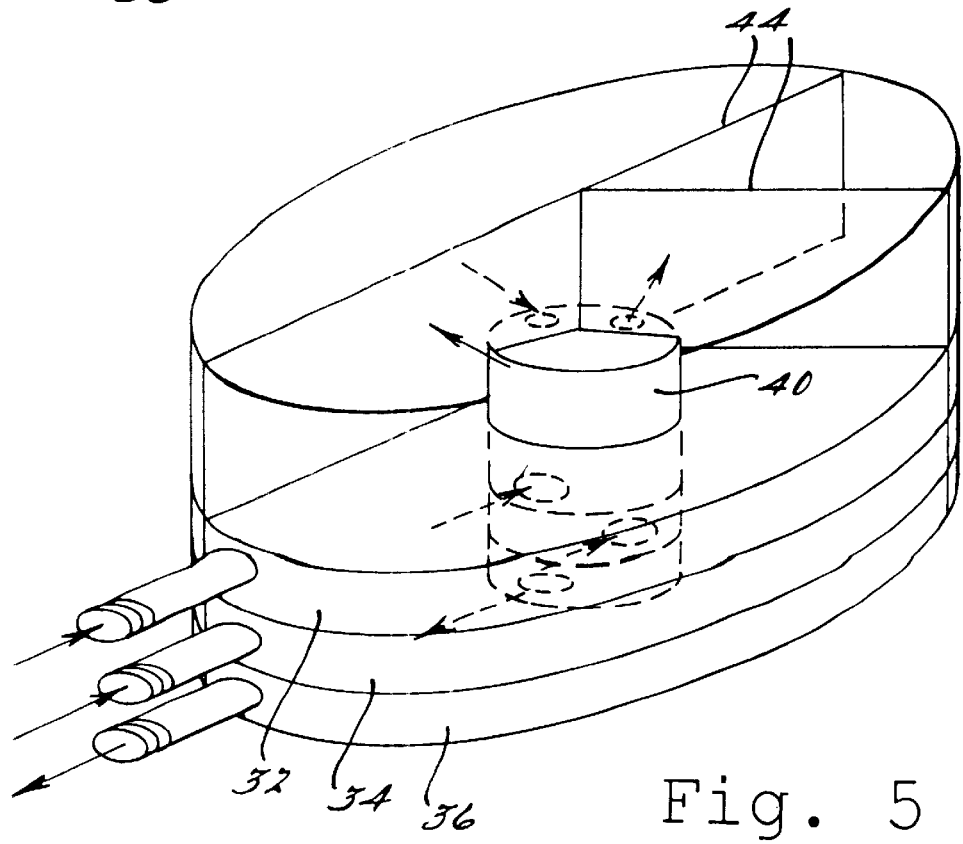
FIG. 5 schematically illustrates an expanded view of the rotary element of the second embodiment.

In accordance with the present invention, a second embodiment is shown in FIGS. 4 and 5. The second embodiment is better suited for handling large gas flows that require a large size of heat sink material. The heat exchange channels 15, having a first and a second end, are stationary. As in the first embodiment, a transfer chamber 16 is sealed and connected to housing 12 at a second end of rotor 14. A heater device 18 is disposed within chamber 16. The heater device 18 may comprise a burner, an electric heater, or other heat generating means and may be utilized either externally or internally of chamber 16. A plurality of layered sections are located at a first end of RCO 10. Section 32 comprises an input chamber, section 34 comprises an optional purge chamber, and section 36 comprises an output chamber. Section 38 comprises a dividing chamber that lies adjacent to, and in fluid communication with, the first ends of the channels 15. A one-piece rotating element 40, having a first and a second end, rotatably extends through the input, purge, output, and dividing chambers. Element 40 is internally divided into three separate passages, each passage forming a separate flow path and communicating with either the input, purge, or output chamber. Dividing plates 44, rotatably engaged within chamber 38, comprise the second end of element 40, and divide chamber 38 into alternating input, purge, and output zones. As shown in FIG. 5, element 40, comprising plates 44, rotates as a one-piece flow distributor, providing alternating gaseous flow to the several zones. Dividing plates 44, radially spanning the RCO 10, are sealed against the first end of the channels 15, thereby creating input, purge, and output sections within the plurality of heat exchange channels. Plates 44 may be sealed either pneumatically, hydraulically, physically, or by other methods known in the art.

In operation, an input stream flows into chamber 32, through rotating element 40, into the inlet zone of chamber 38, and through the input section of heat exchange channels 15 for catalytic treatment. The gas then flows into transfer chamber 16 for further thermal oxidation if desired. The heater device 18 may be simply used to supply the heat necessary for startup of the catalytic process, or it may be used on a continuous basis, thereby facilitating thermal oxidation within chamber. The gases are forced through the transfer chamber 16 back through the outlet section of channels 15, thence through the outlet zone of chamber 38, through element 40, into chamber 36, and out of the RCO 10. A fraction of the output stream, or other air, may be directed into the purge stream flowing into chamber 34, through element 40, into the purge zone of chamber 38, through the purge section of channels 15, through the transfer chamber 16 and into the exhaust gas. Any other known purge method, by vacuum for example, may also be utilized. As the rotating element 40 and the dividing plates 44 continue to rotate, the stationary heat exchange channels 15 alternate in function, whereby one channel will serve an input, purge, and output function upon one complete rotation of the element 40. The load required to turn the rotating element 40, in contrast to turning the rotor 14 in the first embodiment, is substantially reduced.

Figure 7:
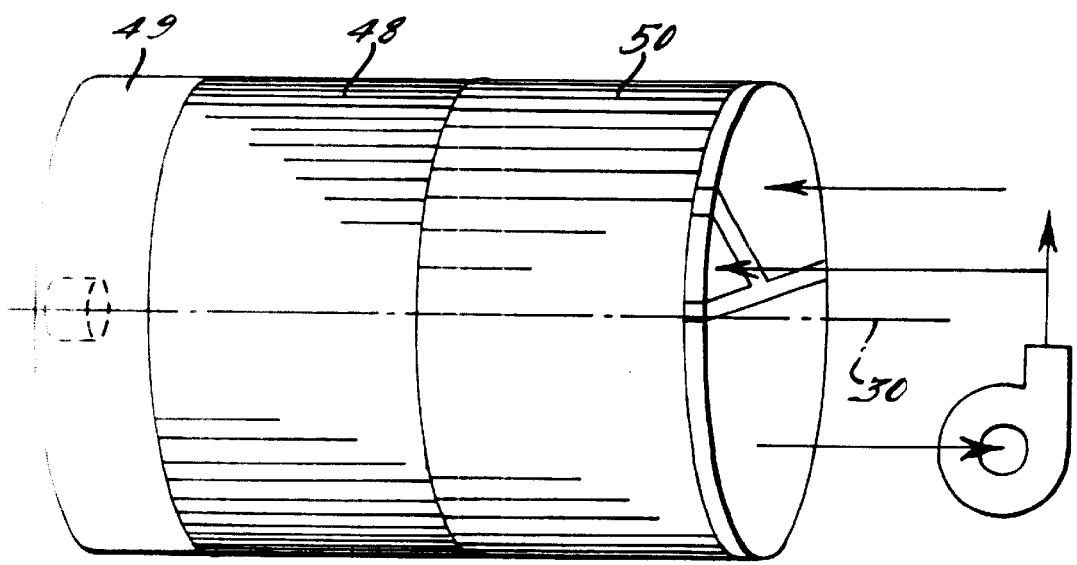
FIG. 7 illustrates a third embodiment of a rotary regenerative catalytic oxidizer having two in-line rotatable heat regenerative beds.
Figure 8:
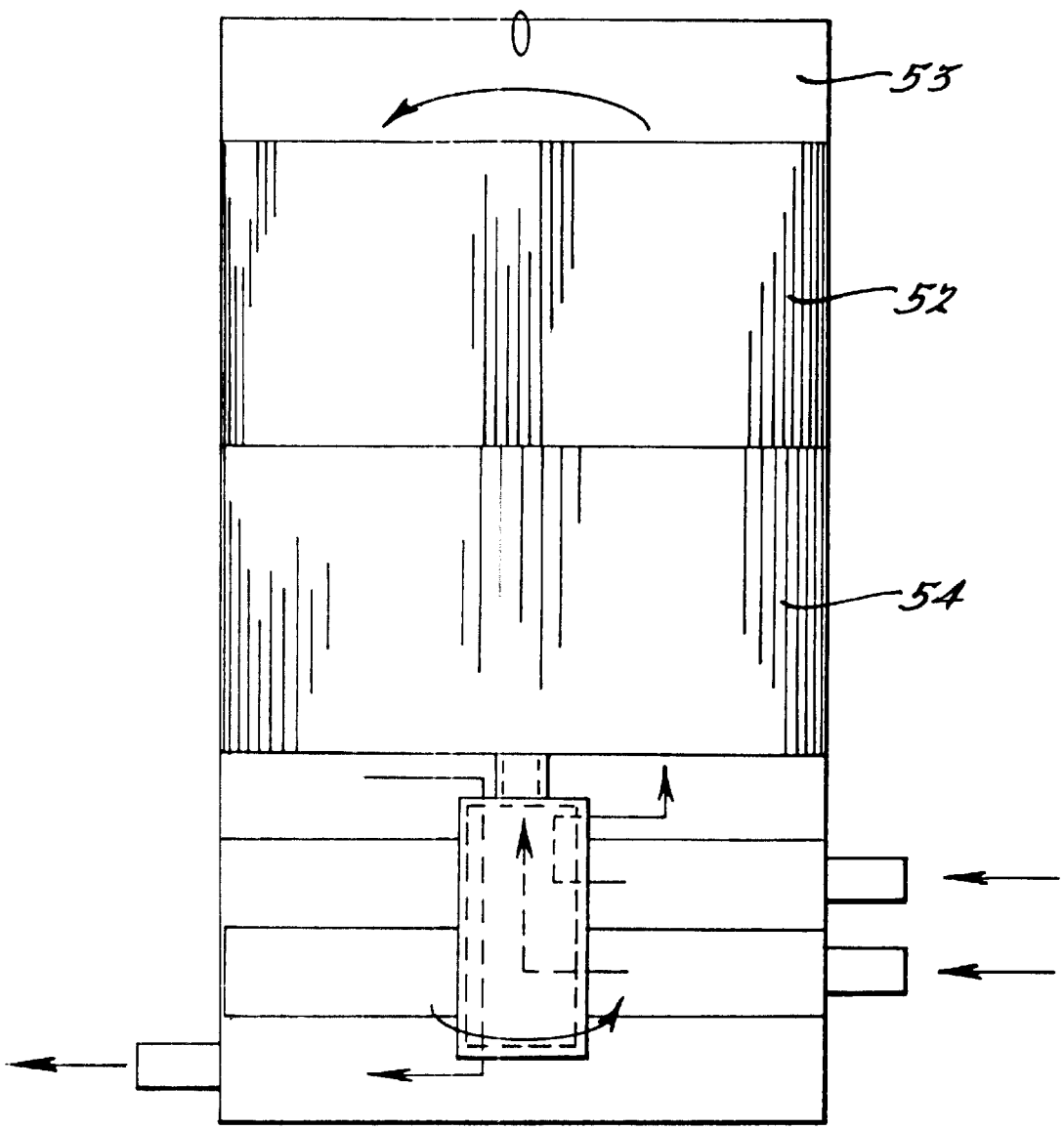
FIG. 8 illustrates a fourth embodiment of a rotary regenerative catalytic oxidizer, having a rotary element and two in-line stationary heat regenerative beds.

Generally, purge options are included for high VOC contaminated process gases. In accordance with yet another aspect of the present invention, purification of high-VOC gases may be enhanced by utilizing a combination of two or more in-line rotary heat exchange beds. The in-line rotors function essentially as that described in the first embodiment above. As shown in FIG. 7, the unit comprises a downstream and upstream rotor, 48 and 50 respectively, in close proximity to each other and rotating at the same speed. Alternatively, the upstream rotor may rotate and the downstream rotor may be fixed in place wherein the upstream rotor actually functions as an RCO and as a flow distributor for the downstream rotor. Furthermore, as shown in FIG. 8, a fourth embodiment may comprise two in-line stationary heat regenerative beds that incorporate a flow distributor as described in the second embodiment above. As shown in FIG. 8, the unit comprises a downstream and upstream heat regenerative bed, 52 and 54 respectively, in close proximity to each other.

In operation, and in accordance with FIGS. 7 and 8, the process gases first pass through the upstream rotor and are then directed through the downstream rotor. The upstream rotor 50 or 54, is preferably formed from heat exchange channels of relatively thick walls and low cell density, and has an approximate 40–50% void volume existing between the walls. The downstream rotor 48 or 52, is formed from heat exchange channels of relatively thin walls and high cell density, and has an approximate 60–80% void volume. The downstream rotor 48 or 52 is equipped with a transfer chamber 49 or 53, as in the first and second embodiments described above. The thick wall/low cell density rotor within the upstream rotor increases heat storage, reduces VOC carryover from the colder zone, and also reduces the pressure drop through the unit. After first being heated by the upstream rotor 50 or 54, the process gases increase in temperature and create a hotter temperature zone within the downstream rotor 48 or 52. Because of the higher temperature, a relatively higher cell density can be used within the downstream rotor 48 or 52 to increase gas/solid contact area, and thereby increase the destruction efficiency. Depending on design expedients, each of the in-line rotors may be comprised of honeycombed channels formed from different materials. For example, the upstream rotor may comprise a honeycombed metallic bed, while the downstream rotor may comprise a honeycombed catalyzed ceramic bed. As would be appreciated by one skilled in the art, other combinations of catalyzed or uncatalyzed metallic and ceramic rotors may be used and such combinations are within the scope of this invention.

With regard to the first and third embodiments, the rotor 14 rotates at 0.5 to 10 revolutions per minute, depending on the thermal efficiency desired. For example, if high-VOC process gases are directed into the RCO 10, then the cycles per minute can be decreased to lower the thermal efficiency and operate under a self-sustaining mode. On the other hand, if low-VOC process gases are directed into the RCO 10, the cycles per minute can then be increased to raise the thermal efficiency and lower the energy consumption. The rotating element 40 of the second embodiment may be similarly adjusted to modify the thermal efficiency.

The RCO 10 is significantly smaller than an RCO of fixed-bed design, and yet has an equivalent thermal efficiency. Thermal efficiency, or A, can be expressed by the following formula:

$$\mu = (T_{max} - T_{out})/(T_{max} - T_{in})$$

where T represents temperature.

Thermal efficiency depends on a number of complex factors. For a given gas flow, thermal efficiency increases with increasing heat transfer rate between gas and solids, increasing the solid thermal mass, and decreasing the cycle time. Mathematically, thermal efficiency can be expressed as a function of two parameters: reduced length and reduced period.

$$\text{thermal efficiency} = f(\text{reduced length, reduced period}) \quad (1)$$

where, $$L = \text{reduced length} = hA/mfcf \quad (2)$$

and, $$Rp = \text{reduced period} = (hA/MsCs)*P \quad (3)$$

Figure 6:
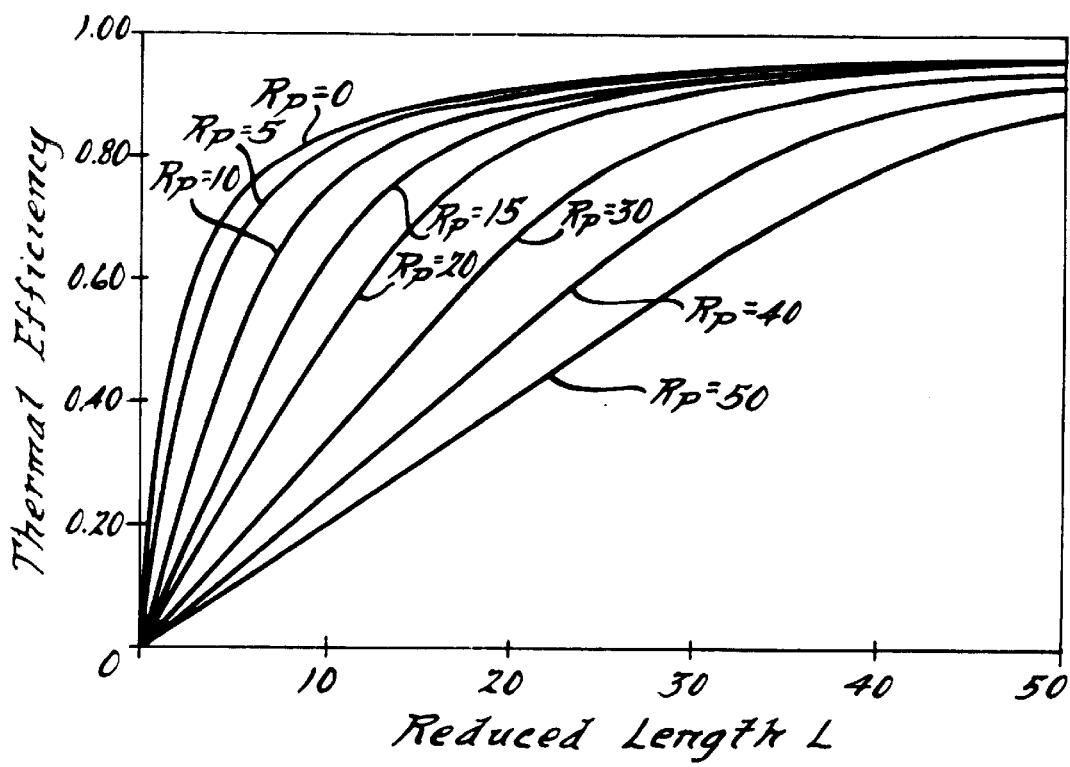
FIG. 6 is a graph illustrating the effect of reduced length and reduced period on thermal efficiency.

As given in the equations, h is the heat transfer coefficient, A is the heat transfer area, and mf and cf are gas flow and gas specific heat, respectively. Ms and Cs are solid mass and solid specific heat, respectively. P is the period of a regenerator zone before switching. FIG. 6 illustrates the relationship of thermal efficiency with regard to reduced length, L, and reduced period, Rp.

The heat transfer area, A, can be varied by using different shapes and sizes of heat transfer material. A smaller size regenerator packed with high geometric area material and a large regenerator packed with a lower geometric area material may have the same heat transfer zone, or reduced length. Nevertheless, the thermal efficiency of the smaller regenerator would be less than that of the large regenerator if the cycle period was the same for both. The smaller thermal mass of the small regenerator results in a larger number of the reduced period. As shown in FIG. 6, the thermal efficiency decreases as the reduced period is increased and as the reduced length is decreased.

For a fixed-bed RTO/RCO, the cycle time typically operates at 60–180 seconds, and then the gas flow is reversed. Any further reduction in the cycle period, created by switching the flow valves at time intervals of less than 60 seconds, is limited by consequential pressure pulses resulting in unsteady operation. Unlike the fixed-bed system, the rotary design of the present invention does not have flow reversal problems. The cycle time can be reduced with no adverse effect on unit stability, or on upstream process conditions. As such, a rotary regenerative oxidizer, in accordance with the present invention, can take full advantage of a high geometric area packing system, thereby reducing the volume of the oxidizer while maintaining an equivalent thermal efficiency. As Table 1 below shows, when using a honeycomb of 200 CPSI, the bed of a rotary regenerator can be as small as 1/10 the size of a typical conventional fixed-bed regenerative system.

TABLE 1

RRCO compared to a fixed-bed RCO, each having a constant heat capacity and a thermal efficiency of 92%.

|  | RRCO | FIXED-BED RCO | FEATURES |
| --- | --- | --- | --- |
| HEAT REGN. MEDIA | 200 CPSI MONOLITH | 1" SADDLE | RRCO HEAT TRANSFER MUCH HIGHER |
| HEAT TRANSFER AREA | 640 ft$^2$/ft$^3$ | 70 ft$^2$/ft$^3$ |  |
| CYCLES | ROTATES 10 RPM (CONTINUOUS) | 1 TO 3 MIN EACH PERIOD | RCO LIMITED BY VALVE SWITCHING |
| GAS FLOW RATE PER VOLUME OF HEAT TRANSFER MATERIAL | 20,000 1/hr | 2,000 1/hr | RRCO VOLUME = 1/10 RCO VOLUME, FOR SAME GAS FLOW RATE AND SAME $\mu$ |

In accordance with the present invention, continuous rotation of the rotor facilitates steady state treatment of the process gases. The thermal efficiency can be decreased from 92% to 87% simply by reducing the rotational speed from 10 rpm to 1 rpm. The simple method of adjusting thermal efficiency represents a significant improvement when handling streams that contain varied solvent loading. As the solvent loading becomes relatively high, the thermal efficiency must be lowered to maintain a thermal balance. Certain known rotary designs incorporate a rotational feature that indexes the rotor. Continuous rotation, in contrast to indexing, permits simplified tailoring of the cycle period and thus, a corresponding decrease or an increase in the thermal efficiency if desired. On the other hand, fixed-bed, non-rotary recuperative systems are even less flexible and often require a unit shut down that effectively blocks off some of the heat exchange surface.

In accordance with the restaurant applications of the present invention involving flow rates of 100 to 2,000

SCFM, the rotary heat exchange designs of the present invention reduce the pressure drops, and the associated energy costs, by more than half when compared to fixed-bed designs. Possible applications include purification methods involving groundwater treatment, indoor air clean up, paint spray booths, paper and pulp gases, and manufacturing of electronic components.

Unlike known fixed-bed RCOs, the present invention accommodates flow rates of 100–2,000 SCFM in a regenerative heat exchanger at a reasonable capital cost. Of course, larger flow rates may be accommodated by an increase in the size of the rotary RCO. Unlike conventional fixed-bed RCOs that have periodic flow reversal as a heat recovery means, the rotary RCO 10 features parallel channels 15 that revolve as rotor 14 rotates, or a rotatable flow distributor 40, each of which operate in steady state. Thus, pressure fluctuations associated with fixed-bed RCO designs are eliminated.

The rotary RCO is generally operated in flow rates normally found with recuperative heat exchangers. In contrast to a recuperative heat exchanger, a rotary regenerative heat exchanger provides a more uniform axial temperature, and therefore more uniform surface temperatures. As such, recuperative heat exchanger concerns such as corrosion caused by "cold spots", condensation, and poor thermal efficiency are eliminated.

Unlike many rotary treatment systems of the related art, the preferred embodiment of the present invention combines the thermal and catalytic components into one bed. In contrast to gaseous flow perpendicular to the axis of rotation, the input and output flow efficiency is enhanced by directing the flow through axially parallel channels. Furthermore, the only independent sealing means required is the sealing plate 44 located at the "cold" or input/output end of the system. The inherent seals of the heat exchange channels ensures simplified flow separation. In contrast, related art systems require sealing mechanisms that must be heat resilient due to the elevated heat exposure of their particular designs. This complicates the system, and increases manufacturing costs.

Yet another benefit is that the various embodiments function with a reduction in parts normally found in known oxidizers. For example, many known rotary valve regenerative oxidizers use metallic partitions contained within the heat exchange beds. This design results in maintenance concerns due to leakage and stress cracks, and is more costly to construct. No metallic partitions are utilized in the present invention and as such, leakage is reduced, manufacturing costs are minimized, and treatment efficiency is enhanced. Other known designs incorporate multi-component flow distributors. In accordance with the present invention, the rotary distributor comprises a unified or one-piece structure, thereby eliminating the multiple parts found in known distributors, and reducing manufacturing costs.

The embodiments shown may also be tailored to accommodate rotary thermal oxidizer by simply incorporating uncatalyzed heat exchange channels therein. Transfer chamber 16 may utilize a heat generating means, either internally or externally thereof, to ensure sufficient thermal oxidation of the process gases. On the other hand, gases containing elevated levels of VOCS, for example, may only need startup heat to maintain self-sustaining thermal and/or catalytic oxidation.

As noted previously, cleaning of the restaurant smoke abatement system of the present invention is conveniently accomplished in-situ, i.e., without having to remove the rotary device from smoke abatement system. Thus, the method associated with cleaning of the rotary device entails lowering the speed of rotation of the rotary device to allow a heated cleansing stream to thoroughly oxidize any grease or fat contaminants which may have accumulated on the "cold spots" of the rotary device. In cases where the contaminant accumulation is severe, the rotation of the device may be stopped completely to permit complete removal of the contaminants. Whether cleaning lightly or severely contaminated sections of the rotary device, as the section of the rotary device is cleaned, the uncleaned section is rotated into the cleaning stream to remove the unwanted contaminants. After cleaning, the cleaning stream is exhausted to the atmosphere.

The cleansing stream may be air and should be introduced to the rotary device at a temperature sufficient to oxidize the accumulated contaminants, typically a temperature ranging from 600 to 1000° F.

While the preferred embodiments of the invention have been disclosed, it should be appreciated that the invention is susceptible of modification without departing from the scope of the following claims. Thus, one skilled in the art would appreciate that other rotary oxidative devices may be used in conjunction with this invention such as those disclosed in U.S. Pat. No. 5,362,449; international patent application PCT/FR95/01692; and European patent application publication EP 684,427 the disclosures of which are incorporated by reference.

What is claimed is:

1. A system for removal of particulate matter and volatile organic compounds from a cooking emissions stream comprising:

an inlet duct for receiving a flow of the cooking emissions stream and directing the stream to a rotary, heat regenerative device having an axis of rotation such that the flow of the emissions stream through the rotary device is perpendicular or axial with reference to the axis of rotation of the rotary device;

the rotary device comprising:

(a) thermal oxidation and/or catalytic oxidation means whereby the emissions stream is thermally and/or catalytically oxidized;

(b) heat exchanger means to recover heat from the emissions stream after thermal and/or catalytic oxidation and before the oxidized emissions are returned to the atmosphere;

(c) one or more rotors, wherein a first rotor comprises a plurality of discrete heat exchange surfaces arranged in an axially parallel and longitudinal array, said first rotor having a first and second end, wherein the surfaces form a plurality of heat exchange channels;

(d) a transfer chamber connected to the second end of the first rotor;

(e) a sealing end plate adjoining the first end of the first rotor, wherein the end plate divides the first rotor into inlet and outlet compartments;

(f) an adjustable means for rotating the first rotor about the axis of rotation;

(g) a stationary or rotating second rotor, positioned between said first rotor and said transfer chamber, wherein said second rotor comprises a plurality of heat exchange surfaces arranged in an axially parallel and longitudinal array, said surfaces forming a plurality of heat exchange channels in fluid communication with said first rotor and said transfer chamber, said second rotor having a cell density greater than that of said first rotor and an outlet duct for directing the oxidized emissions stream from the rotary device to the atmosphere.

2. The system of claim 1, further comprising an exhaust fan in the outlet duct.

3. The system of claim 1, further comprising a means for purging unreacted process gases from the first rotor.

4. The system of claim 1, wherein the transfer chamber comprises a heat generating means for heating the emissions stream to a predetermined temperature.

5. The system of claim 1, wherein the surfaces are catalytically coated.

6. The system of claim 4, wherein the surfaces are catalytically coated.

7. The system of claim 1, wherein the first rotor has a cell density of at least 25 cells per square inch.

8. The system of claim 7, wherein the surfaces are formed in a honeycomb monolith comprising a metallic or ceramic substrate.

9. A system for removal of particulate matter and volatile organic compounds from a cooking emissions stream comprising:

- a first heat exchange bed comprising a plurality of heat exchange surfaces, arranged in an axially parallel and longitudinal array, each of said surfaces having a first and a second end, wherein said surfaces form a plurality of heat exchange channels;
- a transfer chamber communicating with the second end of said surfaces;
- a second heat exchange bed, positioned between said first heat exchange bed and said transfer chamber, said second heat exchange bed comprising a plurality of heat exchange surfaces arranged in an axially parallel and longitudinal array, wherein said surfaces form a plurality of heat exchange channels in fluid communication with said first heat exchange bed and said transfer chamber, said second heat exchange bed having a cell density greater than that of said first heat exchange bed;
- a sealing end plate adjoining the first end of said surfaces, wherein said end plate divides said channels into inlet and outlet zones;
- a distribution plenum, fluidly communicating with said heat exchange surfaces;
- a gas inlet plenum, fluidly communicating with said distribution plenum;
- a gas outlet plenum, fluidly communicating with said gas distribution plenum; and
- a one-piece, rotatable flow distributor, wherein said distributor fluidly communicates with said distribution, inlet and outlet plenums.

* * * * *